July 13, 1965 J. K. SHANNON 3,194,687
STORAGE BATTERY
Filed Feb. 20, 1961 2 Sheets-Sheet 1
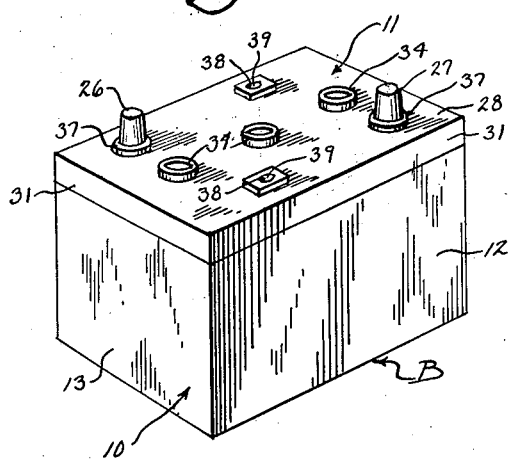
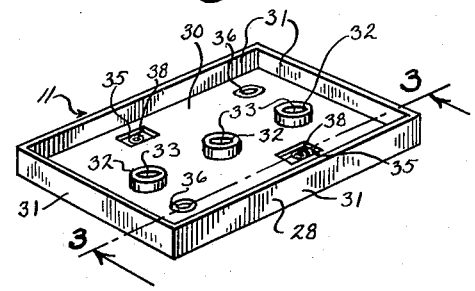
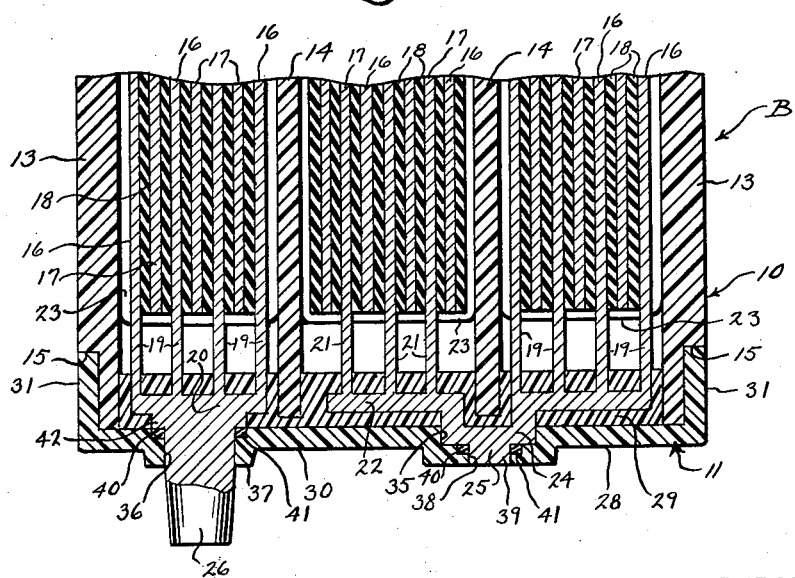
INVENTOR
JOHN K. SHANNON
BY *Wright and Wright*
ATTORNEYS July 13, 1965   J. K. SHANNON   3,194,687
STORAGE BATTERY
Filed Feb. 20, 1961   2 Sheets-Sheet 2
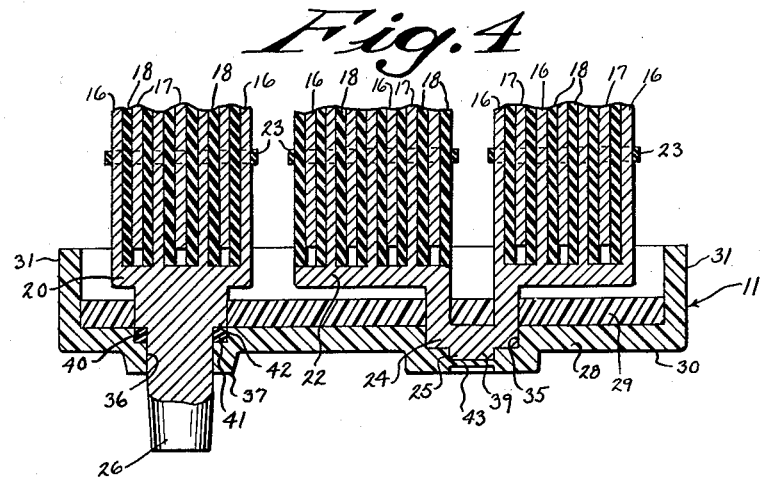
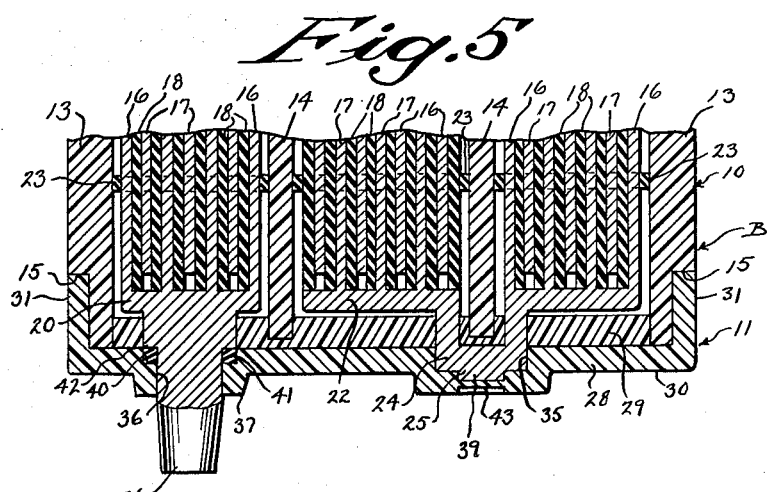
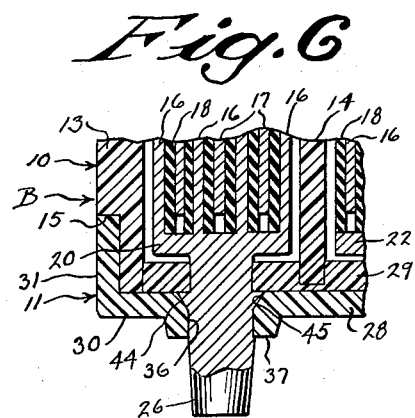
INVENTOR
JOHN K. SHANNON
BY *Wright & Wright*
ATTORNEYS

United States Patent Office 3,194,687
Patented July 13, 1965

3,194,687
STORAGE BATTERY
John K. Shannon, 2028 63rd Place, Kenosha, Wis.
Filed Feb. 20, 1961, Ser. No. 90,487
7 Claims. (Cl. 136—134)

This invention appertains to storage batteries and more particularly to storage battery covers, and to a novel cover construction and means for uniting the same with battery cases, and cell assemblies, to form a substantially integral one-piece unit.

Normally, a hard rubber or plastic part or cover is molded as a separate piece to fit into or over the edges of the battery cell case or container and the thickness of the cover walls usually corresponds to the thickness of the battery case walls to give a desired rugged structure. When the covers fit into the containers and cells thereof a space is provided between the container walls and the cover into which a sealant material is applied which holds the cover in position and for the purpose of preventing solution and gases from escaping between the cover and container. When a cover fits over the edge of the container or case, the cover usually has an inner wall which forms a groove into which the sealant is applied and the container acting as a tongue is pressed into the groove and is secured in the groove by the sealant. Again, the covers are usually of sufficient strength in themselves to hold up physically in normal usage.

One of the primary objects of my invention is to provide an ornamental thin-walled outer cover (which would not in itself withstand the abuses of normal usage) with means for attaching the same to a battery container in such a way as to strengthen the outer cover physically so that it can withstand the abuses of normal usage.

Another salient object of the invention is to provide a storage battery container cover including an ornamental thin-walled preformed outer section which can be readily and economically made in quantities and an inner relatively thick reinforcing section formed from a plastic material, which in its initial state is in a free flowing condition, the outer preformed section (when in its inverted position) in effect forming a mold for the inner section, whereby upon the placing of the cell plate sets with their jump or connector straps and terminal posts in position on the outer section, the inner cover section can be poured into the outer section to a desired level for covering the jump straps and whereby upon the solidifying of the material and uniting thereof with the outer section a rugged one-piece cover will be had.

A further object of my invention is to provide means whereby the container or case can be placed in position over the plates, with the edge of its end, side and partition walls embedded in the material of the inner wall section before the solidifying thereof, so that an additional sealant will not be needed and whereby the inner and outer cover sections and the case, as well as the plates will be effectively united into one homogeneous whole.

A further important object of the invention is the provision of means whereby the connector or jump straps for cells and shoulders or connectors for the lugs of the plate sets can all be embedded in the poured section of the cover during the molding thereof on the battery case, whereby such straps, shoulders and connectors will be effectively insulated and protected from any deleterious action of the battery acid and battery gases thereon.

Another further object of the invention is to provision of means in the outer cover section for receiving the terminal posts and parts of the jump or connector straps for cells, so that the cell plates will be properly supported during the pouring of the inner cover plastic material into the outer cover, and whereby the terminal posts will project their proper ditsance from the cover, after the molding and uniting of the inner and outer sections thereof.

A still further object of the invention is the provision of a novel means of enclosing and protecting the connector straps, shoulders etc. of the battery plates and cells during the molding of the inner and outer cover sections directly on a battery case, which consists in, first, supporting an outer cover section in a horizontal position; second, properly positioning the connected cell plate sets in the mold with the terminal posts projecting through holes provided in the outer cover section; third, pouring a desired amount of plastic material in the outer cover section to a certain level for covering and enveloping the portions of the plate lugs, or shoulders and the cell connector or jump straps as desired; fourth, sliding a premolded battery case in an inverted position over the plates and into the plastic cover material, and finally, allowing the plastic inner cover material to solidify and join the edges of the battery case, cell connectors and plate shoulders, it being understood that the material from which the outer cover section and inner cover section is formed, is compatible so as to unite and provide a single rugged unit structure.

Another still further important object of my invention is to provide vent wells in the outer cover section which serve as a dam to prevent the plastic material of the inner cover section from flowing out of the confines of the outer cover section.

With these and other objects in view, the invention consists in the novel constructon, arrangement and formation of parts, as will be hereinafter more specifically described and claimed, and illustrated in the accompanying drawing, in which drawings, FIGURE 1 is a perspective view of a storage battery including a case or container and the cover constructed in accordance with this invention;

FIGURE 2 is a perspective view of one preferred type of outer cover section utilized in the invention, the outer cover section being shown in its inverted position ready to receive the connected plate sets and the plastic material to form the inner cover section;

FIGURE 3 is a fragmentary longitudinal sectional view through the completed battery with the material of the inner cover section covering plate lugs, connectors and jump straps and with the material of the inner cover section solidified and united with the outer cover section and with the battery case, the section being taken on the line 3—3 of FIGURE 2, looking in the direction of the arrows;

FIGURE 4 is a fragmentary longitudinal sectional view showing a slightly modified form of the invention, the view showing more particularly the outer cover section in its inverted position with the connected cell plate sets in position and with the material of the inner cover section being poured into the outer cover section and prior to the placing of the container or cell case in position;

FIGURE 5 is a view similar to FIGURE 4 but showing the battery case or container placed in position;

FIGURE 6 is a fragmentary detail longitudinal sectional view, showing a slightly further modified form of means for connecting and sealing a terminal post with the cover, and FIGURE 7 is a fragmentary detail sectional view showing the outer cover section of an extreme thinness.

Referring to the drawings in detail, wherein similar reference characters designate corresponding parts throughout the several views, the letter B generally indicates a storage battery embodying the novel features of this invention. As illustrated, the battery B includes a premolded case or container 10 and my novel cover 11.

The battery case 10 can be molded from hard rubber or any other preferred type of plastic material and is of substantially the same type and character as now employed in storage batteries on the market. Thus, the case 10 includes side walls 12 and end walls 13. The side walls 12 are joined by transversely extending partition walls 14 which form in conjunction with the container walls individual cell compartments. As illustrated a three cell battery has been indicated, but it is to be understood that more or less cells can be employed. While I have stated that the case 10 is of substantially the same character as employed in storage batteries now on the market and general use, it is to be understood that the upper edges of the side walls 12 and end walls 13 are formed as well as the partition walls 14 in such a way as to insure the proper molding of the cover 11 thereon so that the cover and case will be correctly united to form a substantially homogeneous unit. Thus, the outer edges of the side and end walls 12 and 13 are reduced in thickness to provide a peripheral shoulder or seat 15. While I have shown this seat 15 formed exteriorly of the case, it is to be understood that the seat could be formed on the inner faces of the side and end walls.

Each cell of the battery B receives a set of alternately arranged positive and negative plates 16 and 17. The positive and negative plates are held in proper spaced position by separators 18. The positive plates 16 have their lugs 19 joined by shoulders or connectors 20. The negative plates 17 have their lugs 21 joined by shoulders or connectors 22. The sets of plates and separators are preferably bound together by a rubber or like band 23. The positive set of plates of one cell are electrically connected to the negative set of plates of an adjacent cell by jump or connector straps 24. These jump or connector straps 24 are preferably, but not necessarily, formed with bosses 25 for a purpose which will be later set forth, but it is to be understood that where these bosses are utilized, the same form test points for cells and this is best shown in FIGURES 3, 4 and 5. The end cells of the battery are provided with terminal posts 26 and 27. The terminal post 26 is carried by and electrically connected with a positive set of plates, while the terminal post 27 is carried by and electrically connected with a negative set of plates. The terminal posts project a material distance beyond the outer surface of the cover.

In order to bring about the molding of the cover 11 on the battery case and the envelopment of the plate lug shoulders and connector straps by plastic material, I form the cover of outer and inner cover sections 28 and 29. The outer cover section 28 is premolded to the proper dimensions according to the size of the battery being made and this premolded outer section 28 includes a top wall 30 and depending peripheral flanges 31. This section can be made from various materials, such as rubber, or a desired plastic material or combination of materials. However, the material from which the outer cover section 28 is made is compatible with the plastic material of the inner cover section 29. The cover section 28 has its walls 30 and 31 formed from a thin section of material, and is made to give a complete finished appearance as to add to the appearance of the entire battery. As the section 28 is formed with thin walls, the same can be quickly and economically molded and when the same is in an inverted position, as shown in FIGURE 2, the wall 30 and flanges 31 form a complete tray or mold, as will be hereinafter more fully set forth.

The wall 30 has its inner surface substantially flat except for spaced annular rings 32 which form dams around the vent openings 33 of the battery. The outer face of the wall 30 has formed thereon upstanding rings 34 around the vent openings and these rings 34 form, in effect, continuations of the rings 32 and provide means for receiving vent caps. The inner face of the wall 30 has also formed therein depressions or wells 35 which form seats for receiving and supporting the connector straps 24. Also formed in the section 28 are openings 36 adjacent to the ends of the battery for receiving the terminal posts 26 and 27. The openings 36 can be surrounded by annular reinforcing flanges 37. In view of the fact that the section 28 is formed with a thin wall, it is advisable to thicken the wall 30 at the depressions or wells 35. As shown in the preferred form of the invention FIGS. 1, 2 and 3, the cover wall 30 can be provided with openings 38 for receiving test bosses 39 formed on the connector or jump straps 24, and these bosses fitting in the openings also aid in sustaining the groups of battery plate sets in their upright position when the same are associated with the section 28. As best illustrated in FIG. 3, the openings 36 for the terminal posts 26 and 27 and openings 38 for the test bosses 39 can have their walls rabbeted, as at 40, to receive gaskets 41 to bring about a seal around the terminal posts and test bosses 39 to prevent the escape of the material which forms the inner cover section 29. As heretofore brought out, the side and end walls or flanges 31 of the section 28 are of such a size as to accommodate, receive and encompass the upper edges of the side and end walls 12 and 13 of the battery case 10, and the lower edges of these flanges snugly fit on the shoulders 15. The terminal posts 26 and 27 have formed thereon shoulders 42 which rest on the gaskets 41 when the posts are inserted into their openings and these shoulders form a stop which determines the distance that the posts extend through the cover and these shoulders on the posts in conjunction with the connector or jump straps 24 also determine the distance between the plate lugs and their connectors from the inner surface of the cover section 28. The gaskets 41 can be made of resilient material for intimate contact with the posts and the test bosses.

With the cell plates, lugs, shoulders, connector straps and terminal posts properly formed, the plates are arranged in their proper order within and on the inner face of the outer section 28. The terminal posts 26 and 27 are placed in their openings 36 and the jump straps are placed in their seats 35 with the test bosses 39 fitting in their openings 38. The jump straps 25 and shoulders on the terminal posts 26 and 27 are supports for the plates in the outer cover or mold section 28.

The inner cover section 29 is now ready to be formed and the plastic material from which the inner cover section is made is now poured in its flowing state into the outer cover section 28 to the desired level. This level can be sufficient to completely cover, enclose and envelope the plate lug shoulders or connectors, the connector or jump straps 24 for the plate seats, with the exception of the outer faces of the jump straps which rest against the lower walls of the wells 35.

The plastic material from which the section 29 can be made, by way of example, can be epoxy resin, phenolics or the like, and from the same material as the outer cover section 28, and preferably from a material which is compatible with the material from which the battery case 10 is made, so that the material from the inner section 29 will mingle with the material from which the outer section and cover is made to form a homogeneous single unit.

With the plastic material poured into the outer cover section to a desired level, the battery case 10 is now inverted and inserted into the cover with the edges of its side and end walls forced into the fluid plastic and this plastic wil flow around the edges of the side and end walls of the case and on the seat 15. When the cover material solidifies, the entire battery can then be turned right side up for further processing or use. Actually, if so desired, the shoulder 15 can be placed an exact distance from the wall edges so that a slight space will so that the fluid plastic will flow under the same and there can be a slight space between the flanges 31 of the outer cover section and the walls of the case to permit the flow of plastic material around the same.

Great stress is laid on the fact that the outer cover section is a decorative retainer or mold for the plastic material for the inner cover section 29 which is poured into the outer section to form the complete battery cover, which in turn is molded to the battery case and various cell connectors, shoulders and terminal posts of the battery and that this mold or outer cover section stays with the battery and becomes a permanent part thereof.

The inner cover section 29 when united with the outer cover section 28 effectively reinforces the outer cover section and materially increases the thickness of the wall 30 and hence this cover 11 is enabled to withstand normal shocks and usage.

In FIGURES 4, 5 and 6, I have shown a slightly modified form of the invention and in this form the plate lug shoulders are disposed above the level of the poured material for the inner section 29, and in this form, and before the inverting of the battery, the outer cover section 28 can be rocked back and forth to splash the plastic material of the inner cover section 29 on the lug shoulders and connector straps to coat the same and adjacent battery case wall parts.

Also, as shown in FIGS. 4 and 5, the openings for the bosses 39 need not extend all the way through the cover, but a frangible thin section part 43 can be left over the bosses and when it is desired to test cell plates, the thin section 43 can be broken to expose the test bosses.

As shown in FIG. 6, I may omit the flexible or resilient gaskets or grommets 41 and in lieu thereof, tapered shoulders 44 on the terminal posts with tapered seats 45 around the walls of the terminal post openings may be provided. The tapered shoulders and tapered seats form a good seal and support for the terminal posts.

In FIG. 7 I have shown the outer cover section 28 of an extreme thinness, so as to merely form a shell which can be economically made and which will still form the desired mold for the inner reinforcing section 29. The view also illustrates the space between the top wall 30 of the cover section 28 and the side walls or flanges 31 spaced from the battery case to permit the flow of the fluid material from which the inner cover section 29 is formed between the cover and the case so as to insure the binding of the cover with the case.

From the foregoing description, it can be seen that I have provided a novel means for molding a one-piece cover directly on a battery case and in such a manner that plate lug shoulders, cell connector straps etc. can be completely embedded within the cover itself.

Changes in details may be made without departing from the spirit or the scope of this invention, but what I claim as new is:

1. A storage battery comprising a case including side and end walls and a cover therefor including an outer preformed thin section having a finished appearance and including a top wall and depending flanges, said section when in an inverted position forming a mold tray, the inner face of said top wall having spaced jump strap seats therein, and groups of cell plates having the negative plates of one set connected with the positive plates of another set by jump straps and said jump straps being fitted in the seats in the top wall of the outer cover section, and an inner poured cover section intimately engaging the entire inner face of the top wall of the outer section and sides of the flanges to a predetermined distance and covering said jump straps, said side and end walls of the case having their edges inserted into the cover and into the inner section, said inner and outer cover sections being formed of compatible material whereby the material of the two sections will unite to form a homogeneous whole with the jump straps embedded in the material of the inner section.

2. A battery case as defined in claim 1, and said plates of the groups being connected by shoulders and said shoulders being embedded in the material of the inner section.

3. A battery case as defined in claim 1, and said jump strap sets formed in the top wall of the outer section having communication with the outer face of said section by openings, and said jump straps having test bosses received in said openings.

4. A storage battery as defined in claim 1, said top wall of the outer section having openings therein and terminal posts formed on the end groups of plates snugly received in said openings, and cooperative means between said posts and the walls of the openings to prevent escape of the material forming the inner section when the material of the inner section is being poured into the outer section.

5. A battery case as defined in claim 4, and said last named means including flexible and resilient gaskets fitted in the walls of the terminal post openings and snugly gripping the terminal posts.

6. A battery case as defined in claim 4, and said last named means including tapered shoulders on the terminal posts and tapered seats for said shoulders formed in the walls of the terminal post openings.

7. A storage battery comprising a case including side and end walls and a cover therefor, positive and negative plates therein with jump straps therebetween, and terminal posts which project beyond said cover, said cover including an outer preformed thin section having a finished appearance formed of a top wall with depending peripheral flanges, said top wall having vent openings with depending annular rings as dams about said openings, and terminal post openings in said top wall, said terminal posts sealing said terminal post openings and said section, when in an inverted position, forming a mold tray, and an inner poured cover section intimately engaging the entire inner face of the top wall of the outer section and sides of the flanges, the ring, and the terminal posts to a predetermined distance, said side and end walls of said side and case having their edges inserted into the cover and into the inner section, said inner and outer cover sections being formed of compatible material whereby the material of the two sections will unite to form a homogeneous whole.

References Cited by the Examiner

UNITED STATES PATENTS

| 2,801,276 | 7/57 | Toce et al. | 136—166 |
| 2,880,261 | 3/59 | Duncan | 136—170 X |
| 2,911,682 | 11/59 | Ewald | 18—58 |
| 2,942,058 | 6/60 | Herold | 136—166 |
| 2,962,767 | 12/60 | Trojanowski et al. | 18—58 |

JOHN H. MACK, *Primary Examiner.*

JOHN R. SPECK, JOSEPH REBOLD, *Examiners.*